US011588684B2

(12) United States Patent
Robison, Jr. et al.

(10) Patent No.: US 11,588,684 B2
(45) Date of Patent: Feb. 21, 2023

(54) DEVICE PROVISIONING USING DEDICATED CREDENTIAL STORAGE

(71) Applicant: Dell Products L.P., Round Rock, TX (US)

(72) Inventors: Charles Delbert Robison, Jr., Buford, GA (US); Joseph Kozlowski, Hutto, TX (US); Daniel Lawrence Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 17/063,419

(22) Filed: Oct. 5, 2020

(65) Prior Publication Data

US 2022/0109606 A1    Apr. 7, 2022

(51) Int. Cl.
*H04L 12/24* (2006.01)
*H04L 9/32* (2006.01)
*H04L 9/08* (2006.01)
*H04L 41/0806* (2022.01)

(52) U.S. Cl.
CPC ........ *H04L 41/0806* (2013.01); *H04L 9/0894* (2013.01); *H04L 9/3263* (2013.01)

(58) Field of Classification Search
CPC .. H04L 41/0806; H04L 9/0894; H04L 9/3263
USPC ....................................................... 713/175
See application file for complete search history.

(56) References Cited

U.S. PATENT DOCUMENTS

| | | | |
|---|---|---|---|
| 2018/0145971 A1* | 5/2018 | Mistry | H04L 63/0823 |
| 2019/0332773 A1* | 10/2019 | Konetski | H04L 63/126 |
| 2020/0162454 A1* | 5/2020 | Jain | H04L 63/0853 |

* cited by examiner

*Primary Examiner* — Kambiz Zand
*Assistant Examiner* — Phuc Pham
(74) *Attorney, Agent, or Firm* — McDermott Will & Emery LLP (57) ABSTRACT

A disclosed method for provisioning a computing device includes receiving, by provisioning software that executes on the computing device to provision the computing device for access to an enterprise infrastructure from a device orchestration service through which computing devices are provisioned to access the enterprise infrastructure, a digital certificate representing a credential for accessing, by a user via the computing device, the enterprise infrastructure. The method also includes storing, by the provisioning software, the digital certificate in dedicated secure credential storage on the computing device, receiving, by the provisioning software, a one-time-usable nonce value generated by the device orchestration service and usable by the provisioning software to unlock the digital certificate stored in the dedicated secure credential storage, unlocking the digital certificate, and presenting the digital certificate to the enterprise infrastructure to authorize access to the enterprise infrastructure by the user via the computing device.

18 Claims, 4 Drawing Sheets

DEVICE PROVISIONING USING DEDICATED CREDENTIAL STORAGE

BACKGROUND

Field of the Disclosure

This disclosure relates generally to information handling systems and, more particularly, to device provisioning using dedicated credential storage.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional deployment methods for information handling systems depend heavily upon the Information Technology (IT) department of the customer. For example, a member of the IT department may order computing devices for multiple end users at the customer, all of which are shipped and delivered to the IT department. The IT department provisions the computing devices for access to their customer infrastructure, after which the IT department delivers them to the end users. For example, the IT department may be responsible for the enterprise-wide configuration, deployment, and management of IT system resources as well as the computing devices of end users. While this approach may work reasonably well when the end users are co-located in a customer facility, it may be unsuitable in situations in which some or all of the end users are working remotely.

SUMMARY

In one aspect, a disclosed method for provisioning a computing device includes receiving, by provisioning software that executes on the computing device to provision the computing device for access to an enterprise infrastructure from a device orchestration service through which computing devices are provisioned to access the enterprise infrastructure, a digital certificate representing a credential for accessing, by a user via the computing device, the enterprise infrastructure. The method also includes storing, by the provisioning software, the digital certificate in a secure credential storage location on the computing device, receiving, by the provisioning software via a user interface, a one-time-usable nonce value generated by the device orchestration service and usable to unlock the digital certificate, unlocking, by the provisioning software and using the nonce value, the digital certificate stored in the secure credential storage location, and presenting the digital certificate to the enterprise infrastructure to authorize access to the enterprise infrastructure by the user via the computing device.

In any of the disclosed embodiments, the method may further include generating, by the orchestration service and dependent on a unique identifier of the computing device and on infrastructure access information associated with the user, the digital certificate.

In any of the disclosed embodiments, generating the digital certificate may be further dependent on information indicating a configuration of the computing device.

In any of the disclosed embodiments, the method may further include accessing, by an application executing on the computing device, the enterprise infrastructure.

In any of the disclosed embodiments, the method may further include receiving, by the device orchestration service, an indication that end-user deployment has been requested on behalf of the user, and the receiving of the digital certificate, the storing of the digital certificate, the receiving of the nonce value, and the unlocking the digital certificate may be performed in response to determining that end-user deployment has been requested.

In any of the disclosed embodiments, the method may further include providing, to the user by the device orchestration service via a text message or an email message, the nonce value.

In another aspect, a disclosed system for provisioning an information handling system includes a device orchestration service through which information handling systems are provisioned to access an enterprise infrastructure, where the device orchestration service is configured to generate a digital certificate for the information handling system dependent on a unique identifier of the information handling system and infrastructure access information associated with a user, and the digital certificate represents a credential for accessing, by the user, the enterprise infrastructure. The system also includes the information handling system, which includes a secure credential storage medium, a processor, and a memory storing program instructions. When executed by the processor the program instructions cause the processor to receive the digital certificate from the device orchestration service, store the digital certificate in the secure credential storage medium, receive, via a user interface of the information handling system, a one-time-usable nonce value generated by the device orchestration service and usable to unlock the digital certificate, unlock, using the nonce value, the digital certificate stored in the secure credential storage medium, and present the digital certificate to the enterprise infrastructure to authorize access to the enterprise infrastructure by the user via the computing device.

In any of the disclosed embodiments, the system may further include an embedded controller, and the unique identifier of the information handling system may include an identifier of the embedded controller.

In any of the disclosed embodiments, the digital certificate may be valid for a predetermined period of time, and when executed by the processor, the program instructions may further cause the processor to disable the digital certificate stored in the secure credential storage medium in response to the predetermined period of time expiring.

In yet another aspect, a disclosed non-transitory computer readable memory media stores instructions executable by a processor for receiving, on a computing device from a device orchestration service through which computing devices are provisioned to access an enterprise infrastructure, a digital certificate representing a credential for accessing, by a user via the computing device, the enterprise infrastructure. The instructions are further executable by the processor for storing the digital certificate in a secure credential storage location on the computing device, receiving, via a user interface, a one-time-usable nonce value generated by the device orchestration service and usable to unlock the digital certificate, unlocking, using the nonce value, the digital certificate stored in the secure credential storage location, and presenting the digital certificate to the enterprise infrastructure to authorize access to the enterprise infrastructure by the user via the computing device.

In any of the disclosed embodiments, the digital certificate may be dependent on a unique identifier of the computing device and on infrastructure access information associated with the user.

In any of the disclosed embodiments, the receiving of the digital certificate, the storing of the digital certificate, the receiving of the nonce value, and the unlocking of the digital certificate may be performed in response to determining that an end-user deployment service has been requested for the computing device.

In any of the disclosed embodiments, the digital certificate may be valid for a predetermined period of time, and the instructions may be further executable by the processor for disabling the digital certificate stored in the secure credential storage medium in response to the predetermined period of time expiring.

In any of the disclosed embodiments, the infrastructure access information associated with the user may include at least one of account information associated with the user, information identifying an access portal of the enterprise infrastructure, and an enterprise login credential for the user.

In any of the disclosed embodiments, the digital certificate may be further dependent on information indicating a configuration of the computing device.

In any of the disclosed embodiments, presenting the digital certificate to the enterprise infrastructure may include communicating, by the provisioning software, the digital certificate to the enterprise infrastructure in conjunction with a first login to the enterprise infrastructure by the user via the computing device.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

In at least some embodiments, the systems and methods described herein may allow computing systems to be delivered to an end user and to be provisioned for access to the appropriate customer infrastructure on behalf of the end user by provisioning software executing on the computing system itself. The provisioning software may execute on the operating system layer to implement a local provisioning service. The provisioning software may obtain a credential payload from a distribution server of an orchestration service that generates the credential based on device-specific and end-user-specific information. The provisioning software may store the credential within secured credential storage on the computing device, such as in a trusted computing base (TCB), where it can only be unlocked using a nonce value generated for that credential and provided to the end user by the orchestration service.

Particular embodiments are best understood by reference to FIGS. 1-4, wherein like numbers are used to indicate like and corresponding parts.

Figure 1:
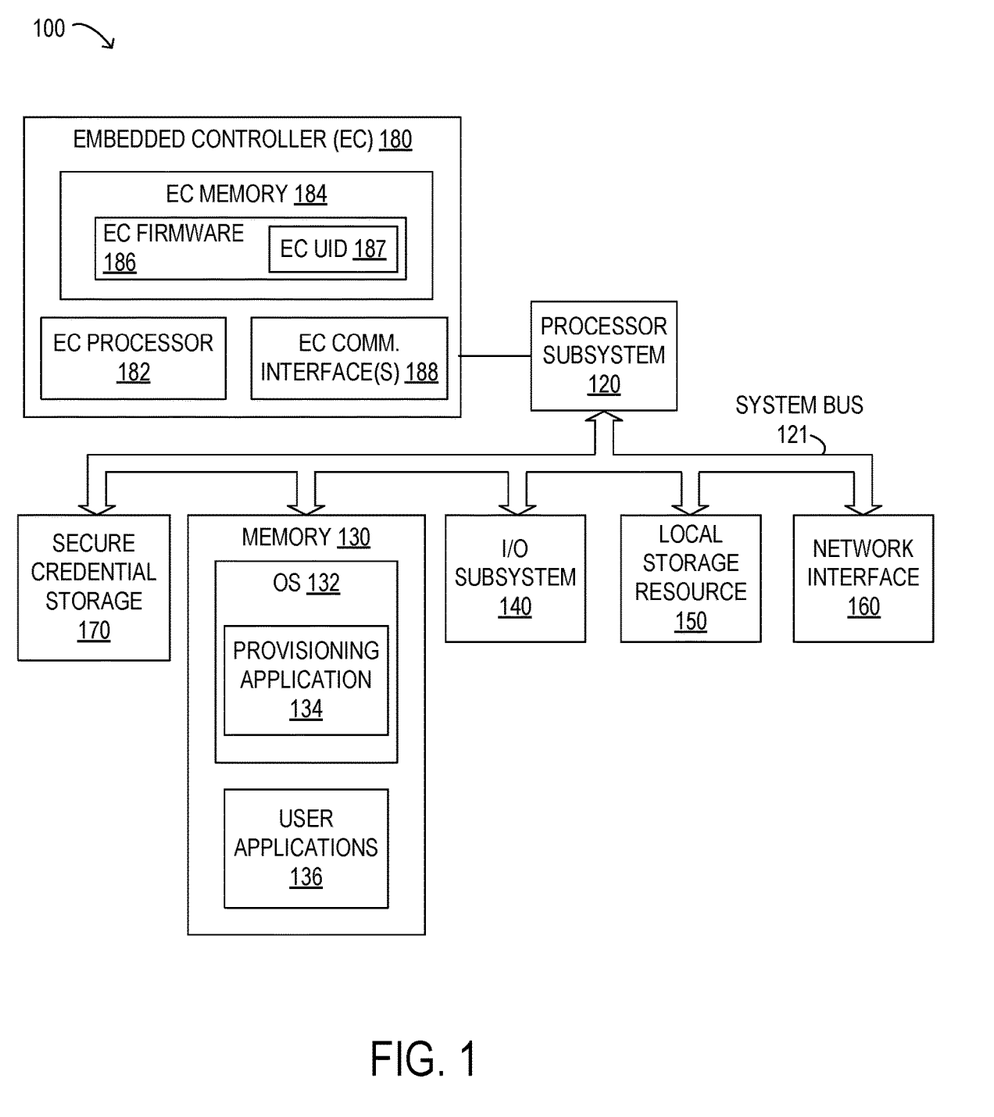
FIG. 1 is a block diagram illustrating selected elements of an embodiment of an information handling system including dedicated secure credential storage.

Turning now to the drawings, FIG. 1 illustrates a block diagram depicting selected elements of an embodiment of an information handling system including dedicated secure credential storage. It is noted that FIG. 1 is not drawn to scale but is a schematic illustration. In various embodiments, information handling system 100 may represent a type of portable device. A portable device may generally be any device that a user may carry for handheld use and that includes a processor. Typically, portable devices are powered using a rechargeable battery. Examples of portable information handling systems may include laptop computers, notebook computers, netbook computers, tablet computers, and 2-in-1 tablet laptop combination computers, among others. In some instances, portable information handling systems may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, a network interface 160, and secure credential storage 170. Also shown within information handling system 100 is embedded controller 180, which is communicably coupled to processor subsystem 120. In some embodiments, secure credential storage 170 may be implemented by a dedicated integrated circuit device on the main circuit board of information handling system 100. While secure credential storage 170 is shown in FIG. 1 as an element of information handling system 100 communicably coupled to other elements of the system over system bus 120, in other embodiments, secure credential storage 170 may be implemented using other technologies and/or may be communicably coupled to other elements of the system using another type of communication interface. In one example, secure credential storage 170 may be accessed through I/O subsystem 140. In another example, secure credential storage 170 may represent a secure location within memory 130 or local storage resource 150. In some embodiments, secure credential storage 170 may only be accessible by provisioning application 134, which may store a digital certificate secure credential storage 170 and may retrieve the digital certificate using a nonce value generated for that purpose. In other embodiments, a basic input/output system (BIOS) may call to a hardware storage service to store the digital certificate within secure credential storage 170 and to protect it via a nonce value generated for unlocking the digital certificate. In some embodiments, the nonce value may be a random or pseudo-random number generated by the orchestration service.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130 or on local storage resource 150). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system. As illustrated in FIG. 1, memory 130 includes provisioning application 134, which operates in the OS layer, and user applications 136, which operate above the OS layer. In some embodiments, user applications 136 may be authorized to access an enterprise infrastructure following the provisioning of the information handling system 100 by provisioning application 134, as described herein.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while information handling system 100 is operating.

Also shown in FIG. 1 is embedded controller (EC) 180, which may include EC processor 182 as a second processor included within information handling system 100 for certain management tasks, including supporting communication and power delivery functions. Thus, EC processor 182 may have access to EC memory 184, which may store EC firmware 186, representing instructions executable by EC processor 182. For example, EC firmware 186 may include power management software, which may represent executable code for managing external DC power sources as well as for controlling various operating parameters of an internal battery of information handling system 100 (not shown in FIG. 1). In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others. In the illustrated embodiment, EC firmware 186 includes an Embedded Controller Unique Identifier (EC UID) 187, which may represent a unique identifier of information handling system 100.

As noted above, an enterprise, such as a corporation or another types of organization, may, conventionally, rely on the IT department of the enterprise to provision computing devices for the use of end users within the enterprise, which may include configuring and authenticating access rights of end users and their computing devices while ensuring privacy and enterprise resource security. In general, the term "provisioning," as used herein, may refer to a process of configuring a computing device on behalf of an end user for accessing enterprise resources such as, for example, network applications, network services, shared compute resources, shared databases or data repositories, and other resources owned or controlled by the enterprise on behalf of its members or other trusted users and/or configuring an enterprise infrastructure to recognize and allow access to enterprise resources by the end user via their computing device. The systems and methods described herein may use provisioning software executing on a computing device and a dedicated secure credential storage on the computing device to support the provisioning of the computing device by an end user of the computing device, reducing reliance on the IT department.

Figure 2:
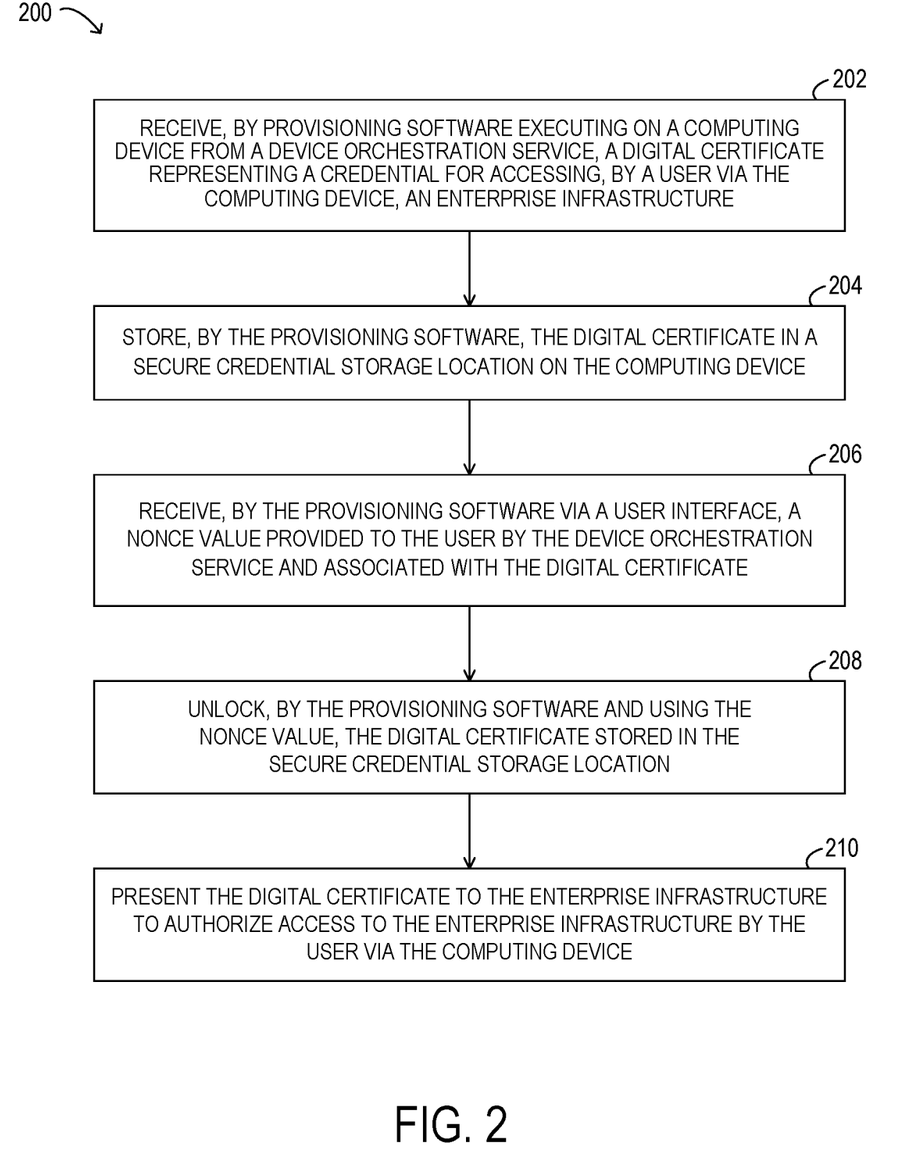
FIG. 2 is flow diagram illustrating selected elements of a method for device provisioning using dedicated credential storage.

Referring now to FIG. 2, selected elements of an embodiment of method 200 for device provisioning using dedicated credential storage, as described herein, is depicted in flowchart form. In certain embodiments, one or more operations of method 200 may be performed by provisioning software, such as a provisioning application 134, executing on the device that is to be provisioned Method 200 may be performed once when the computing system is deployed and provisioned, and may not execute successfully if execution is attempted a second time. It is noted that certain operations described in method 200 may be optional or may be rearranged in different embodiments.

Method 200 may begin, at 202, with provisioning software executing on a computing device receiving, from a device orchestration service, a digital certificate representing a credential for accessing, by a user via the computing device, an enterprise infrastructure. In at least some embodiments, the computing device may be an information handling system such as information handling system 100 illustrated in FIG. 1. In other embodiments, the computing device may be an information handling system including more, fewer, or different elements than those of information handling system 100 illustrated in FIG. 1. As described in more detail herein, the digital certificate may be specific to the computing system and the user. For example, the digital certificate may be generated dependent on a unique identifier of the computing device, such as EC UID 187 shown in FIG. 1 and/or another unique identifier of the requested computing device, and on infrastructure access information associated with the user. In various embodiments, the infrastructure access information associated with the user may include one or more of account information associated with the user, information identifying an access portal of the enterprise infrastructure, and an enterprise login credential for the user. In some embodiments, generating the digital certificate may be further dependent on information indicating a configuration of the computing device, such as a Stock Keeping Unit (SKU) for the computing device. In some embodiments, generating the digital certificate may include encoding, or otherwise embedding, the unique identifier of the computing device, the infrastructure access information associated with the user, and/or the configuration information.

The method may include, at 204, the provisioning software storing the digital certificate in a secure credential storage location on the computing device, such as in secure credential storage 170 illustrated in FIG. 1.

At 206, method 200 may include the provisioning software receiving, via a user interface, a nonce value that was provided to the user by the device orchestration service or, e.g., a distribution server thereof, and is associated with the digital certificate. For example, in some embodiments, the nonce value may be communicated to the user via a text message or an email message. The nonce value may be a one-time-usable value generated specifically for the computing device by the device orchestration service to unlock the digital certificate that was generated specifically for the computing device and the user. In some embodiments, the nonce value may be a random or pseudo-random number generated by the device orchestration service. In some embodiments, the text message or email message may be communicated to the user on the requested computing device itself. In other embodiments, the text message or email message may be communicated to the user on another user device, such as a mobile phone or a tablet device.

At 208, the method may include unlocking, by the provisioning software and using the nonce value, the digital certificate that is stored in the secure credential storage location.

At 210, method 200 may include presenting the digital certificate to the enterprise infrastructure to authorize access to the enterprise infrastructure by the user via the computing device. In some embodiments, presenting the digital certificate to the enterprise infrastructure may include communicating the digital certificate to the enterprise infrastructure in conjunction with a first login to the enterprise infrastructure by the user via the computing device. Once access to the enterprise infrastructure is authorized, user applications executing on the computing device, such user applications 136 illustrated in FIG. 1, may be able to access enterprise resources through the enterprise infrastructure (not shown in FIG. 2).

In some embodiments, the digital certificate may be attested before being released to present to the enterprise infrastructure. For example, the digital certificate may be checked to ensure that it was signed by the appropriate orchestration service or to ensure that the EC UID encoded or embedded in the digital certificate matches that of the computing device. If not, the digital certificate may be destroyed or otherwise disabled, and a message to that effect may be sent to the end user from the orchestration service. In some embodiments, the digital certificate stored in the secure credential storage location may be valid only for a predetermined period of time, and the provisioning software may be configured to disable the digital certificate in response to the predetermined period of time expiring.

Figure 3:
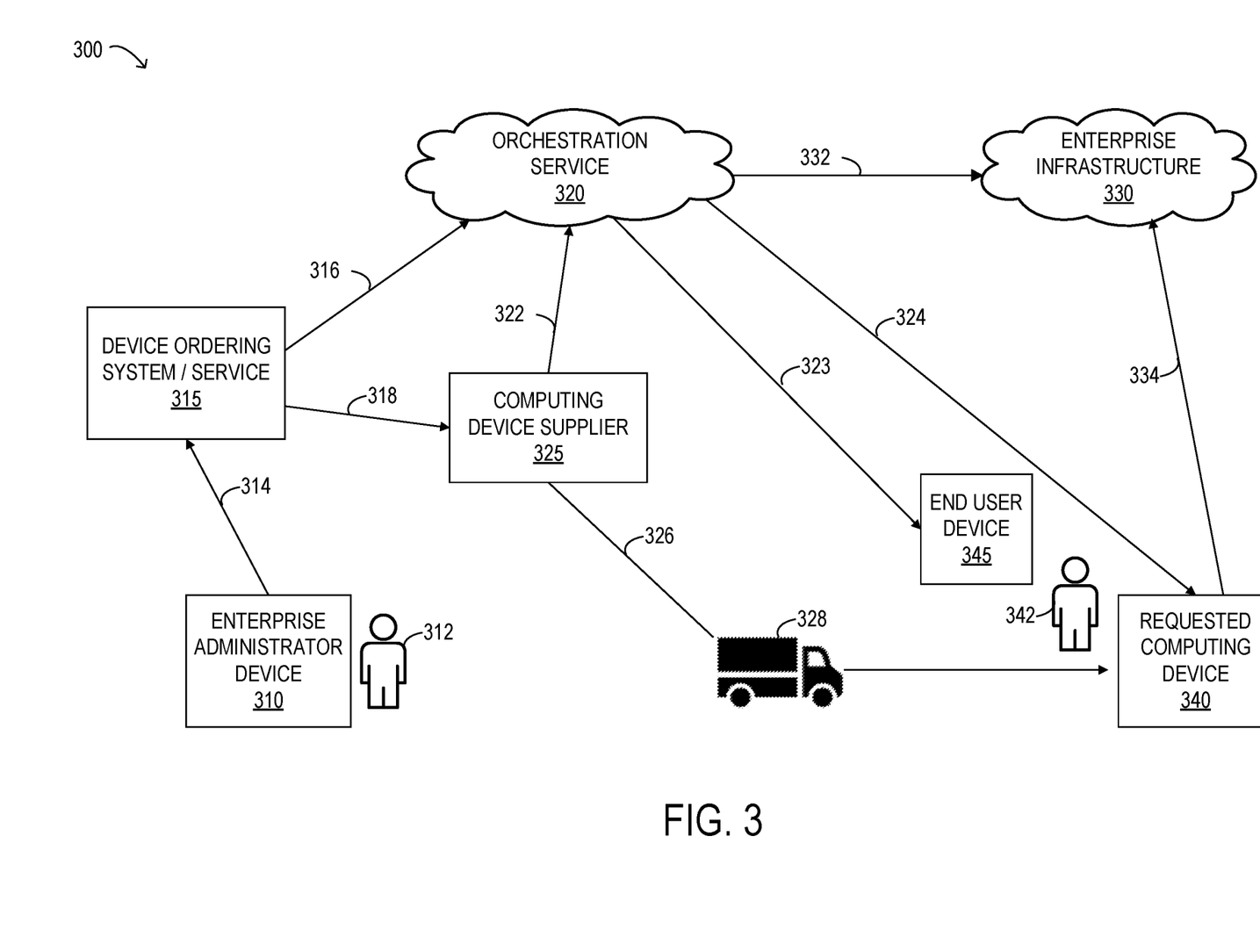
FIG. 3 is a block diagram illustrating selected elements of a system for device provisioning using dedicated credential storage.

FIG. 3 is a block diagram illustrating selected elements of a system 300 for device provisioning using dedicated credential storage. In the illustrated embodiment, system 300 includes a device ordering system or service 315 through which orders for computing devices are placed on behalf of end users of an enterprise, a computing device supplier 325, an enterprise infrastructure 330 through which enterprise resources are made available to end users associated with the enterprise through their computing devices following provisioning and authorization, as described herein, and an orchestration service 320 through which computing devices are provisioned for accessing enterprise infrastructure 330 and through which enterprise infrastructure 330 is provisioned for providing that access, once authorized, on behalf of the enterprise. In some embodiments, orchestration service 320 may be a multi-tenant, cloud-based service and the enterprise may be a tenant of orchestration service 320. In some embodiments, enterprise infrastructure 330 may maintain an active directory for the enterprise, including employees, contractors, or others having rights to access enterprise resources. In some embodiments, enterprise infrastructure 330 may be configured to act as an identity provider for the enterprise.

In the illustrated embodiments, an enterprise administrator 312 may, on behalf of end user 342, place an order for a computing device to device ordering system/service 315 through enterprise administrator device 310. The enterprise administrator 312 may, for example, be an information technology (IT) administrator of the enterprise who places orders for computing devices on behalf of multiple end users associated with the enterprise, such as employees, contractors, or others having rights to access enterprise resources through enterprise infrastructure 330. In some embodiments, enterprise administrator 312 may enter the order through a graphical user interface (GUI) presented on a web site of the ordering system/service 315 or by completing a fillable physical or electronic order form provided by and returned to ordering system/service 315. The information provided by enterprise administrator 312 when placing the order may specify a requested configuration for the computing device and may include infrastructure access information associated with the end user as well as a request to receive optional end-user deployment services. For example, the order may include a first SKU for the computing device and a second SKU for the end-user deployment services. The infrastructure access information associated with the user may include account information associated with the end user, such as a username, email address, or account number. The infrastructure access information associated with the user may also include information identifying an access portal of the enterprise infrastructure, such as a Uniform Record Locator (URL) or other indication of a web address (e.g., login.XYZCorp.com) or IP address through which end users associated with the enterprise can access various enterprise resources, and an enterprise login credential for the user, such as a username, passcode, challenge/response pair, or other login credential with which the end user can log into enterprise infrastructure 330. While in the illustrated embodiment, the order is placed on behalf of end user 342 by enterprise administrator 312, in other embodiments, the order may be placed by end user 342. In at least some embodiments, the computing device for which an order was placed may be an information handling system such as information handling system 100 illustrated in FIG. 1. In other embodiments, the ordered computing device may be an information handling system including more, fewer, or different elements than those of information handling system 100 illustrated in FIG. 1.

As shown in FIG. 3, once the order has been placed, information included in the order may be provided to orchestration service 320. This order information 316 may include any or all of the information described above as being included in the order when it was placed.

As shown in FIG. 3, once the order has been placed, at least some of the device information included in the order may be provided to computing device supplier 325. This device information 318 may include, for example, information specifying a requested configuration for the computing device, such as the first SKU and the second SKU. The first SKU may provide an indication of the components to be included in the requested computing device and may specify version and/or sourcing information for at least some of the components. For example, the SKU may indicate the amount of RAM to be included in memory 130 the computing device, the size of a disk drive to be included as a local storage resource 150 in the computing device, or the version of the processor(s) to be included in processor subsystem 120 in the computing device. In various embodiments, computing device supplier 325 may be an original equipment manufacturer, a facility at which computing devices are assembled based on requirements specified in received orders, a fulfillment center that stocks and ships computing devices meeting various combinations of requirements, or another entity from which a requested computing device may be assigned from available inventory or built to specification.

As shown by 326 in FIG. 3, once computing device supplier 325 has assigned or built the requested computing device, the requested computing device, shown in FIG. 3 as requested computing device 340, may be prepared and shipped to end user 342 using shipping service 328. In addition, once computing device supplier 325 has assigned or built the requested computing device, computing device supplier 325 may provide information about the requested computing device to orchestration service 320. This information may include, for example, a unique identifier of the requested computing device as assigned or built, such as EC UID 187 shown in FIG. 1, a serial number of the requested computing device, a service tag of the requested computing device, and/or an SKU for the requested computing device indicating the actual combination of components included in the requested computing device, as assigned or built, which may include version and/or sourcing information for at least some components. In at least some embodiments, the requested computing device, as assigned or built, may be an information handling system such as information handling system 100 illustrated in FIG. 1. In other embodiments, the requested computing device, as assigned or built, may be an information handling system including more, fewer, or different elements than those of information handling system 100 illustrated in FIG. 1.

In the illustrated embodiment, orchestration service 320 generates, based at least on the order information 316 and device information 318, a digital certificate representing a credential for accessing, by end user 342 via the requested computing device 340, enterprise infrastructure 330. As described herein, the generation of the digital certificate may be dependent on the unique identifier of the requested computing device as assigned or built, on the infrastructure access information associated with the user, and/or on information indicating the actual configuration of the requested computing device as assigned or built. In some embodiments, generating the digital certificate may include encoding, or otherwise embedding, the unique identifier of the requested computing device as assigned or built, the infrastructure access information associated with the user, and/or the information indicating the actual configuration of the requested computing device as assigned or built. In contrast to password-based credentials for provisioning a computing device, a digital certificate, which may also be referred to as a public key certificate or an identity certificate, may be used to encrypt and sign information digitally, providing a high level of security and integrity for device provisioning in system 300. For example, in at least some embodiments, the digital certificate generated by orchestration service 320 may be an electronic credential that binds the identity of the certificate owner to a pair of electronic encryption keys, (one public and one private). In some embodiments, the digital certificate may confirm to the X.509 standard defining the format of public key certificates. Because the digital certificate is generated by orchestration service 320 dependent on device-specific and end-user-specific information, it is a unique credential that may not be usable to provision a computing device other than the one for which it was generated or to provision the requested computing device by anyone other than the end user for whom it was generated.

As illustrated at 324 in FIG. 3, orchestration service 320 or, e.g., a distribution server thereof, may provide the generated digital certificate to requested computing device 340, where it may be received and stored in dedicated secure credential storage, such as secure credential storage 170, on requested computing device 340 by provisioning software, such as provisioning application 134, executing on requested computing device 340.

As shown at 323 in FIG. 3, orchestration service 320 or, e.g., a distribution server thereof, may provide a nonce value to end user 342. In some embodiments, the nonce value may be communicated to the user via a text message or an email message. In some embodiments, the nonce value may be a random or pseudo-random number generated by orchestration service 320. The nonce value may be a one-time-usable value generated specifically for requested computing device 340, as assigned or built, by orchestration service 320 to unlock the digital certificate that was generated specifically for requested computing device 340 and end user 342. In some embodiments, the text message or email message may be communicated to end user 342 on requested computing device 340 itself. In other embodiments, the text message or email message may be communicated to end user 342 on another end user device 345, such as a mobile phone or a tablet device.

As shown as 332 in FIG. 3, orchestration service 320 or, e.g., a distribution server thereof, may provide information to enterprise infrastructure 330 to provision it to allow access by end user 342 via requested computing device 340, once authorized. This process may be referred to as "account provisioning."

After receiving the nonce value from orchestration service 320, end user 342 may, at 334, log into enterprise infrastructure 330, entering the nonce value when prompted. This may unlock and release the digital certificate stored in the secure credential storage and authorize access to enterprise resources through enterprise infrastructure 330 by end user 342 via requested computing device 340. In one example, end user 342 may log into enterprise infrastructure 330 through an access portal of the enterprise infrastructure located at a particular web address (e.g., login.XYZCorp.com).

In some embodiments, the digital certificate may be attested before being released to present to enterprise infrastructure 330. For example, the digital certificate may be checked to ensure that it was signed by orchestration service 320 or to ensure that the EC UID encoded or embedded in the digital certificate matches that of the requested computing device 340, as assigned or built. If not, the digital certificate may be destroyed or otherwise disabled, and a message to that effect may be sent to end user 342 from orchestration service 320. In some embodiments, the digital certificate stored in the secure credential storage location 170 may be valid only for a predetermined period of time, and the provisioning software may be configured to disable the digital certificate in response to the predetermined period of time expiring.

Figure 4:
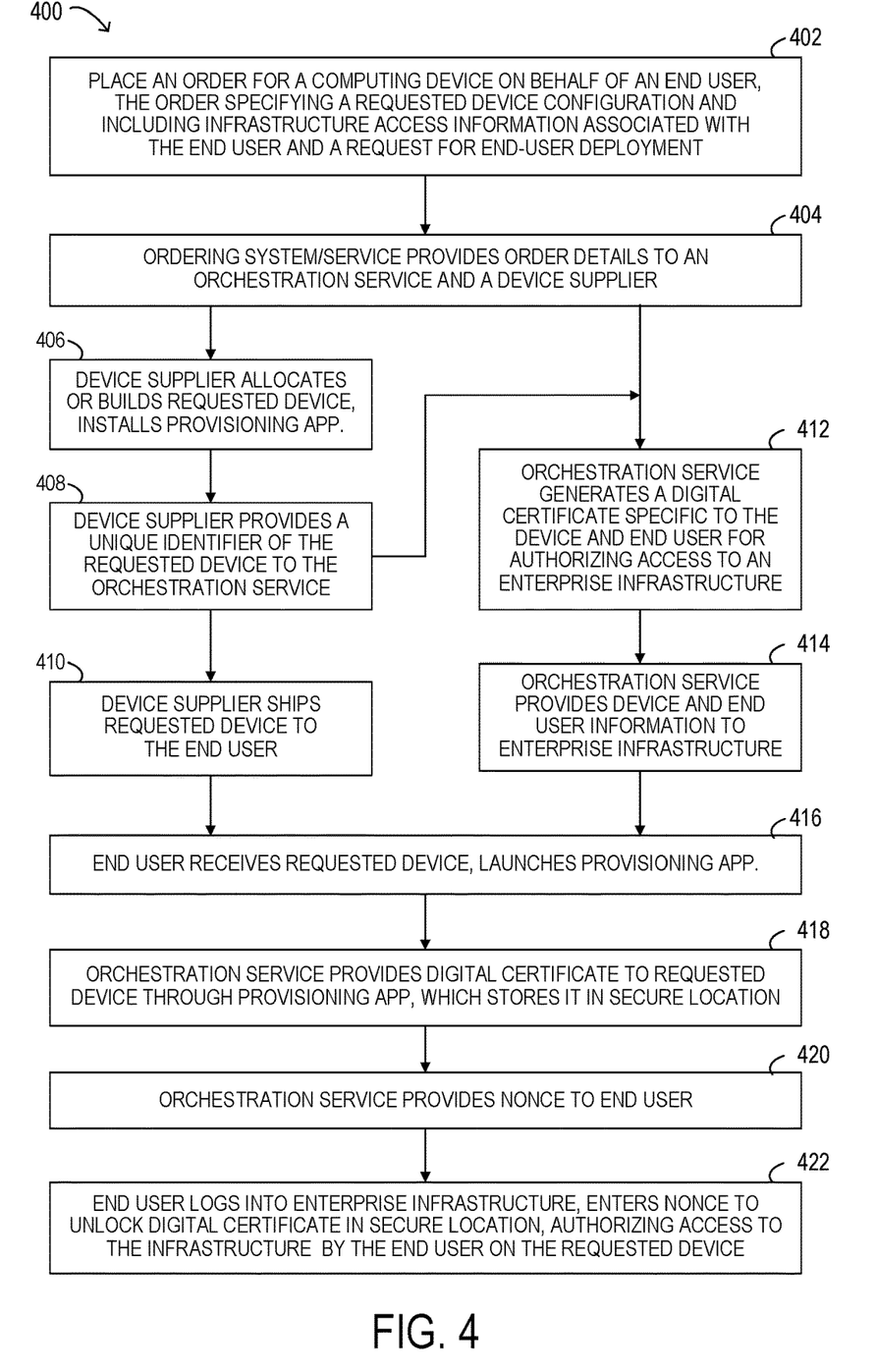
FIG. 4 is flow diagram illustrating selected elements of a method for ordering, receiving, and provisioning a computing device.

Referring now to FIG. 4, selected elements of an embodiment of a method 400 for ordering, receiving, and provisioning a computing device, as described herein, is depicted in flowchart form. Various operations of method 400 may be performed by element of a system for device provisioning, such as system 300 illustrated in FIG. 3. Method 400 may be performed only once when the computing system is ordered, deployed, and provisioned. It is noted that certain operations described in method 400 may be optional or may be rearranged in different embodiments.

Method 400 may begin, at 402, when an order is placed for a computing device on behalf of an end user. In various embodiments, the order may be placed by an administrator within the enterprise in which the end user operates or may be placed directly by the end user. The order may specify a requested configuration for the computing device and may include infrastructure access information associated with the end user as well as a request to receive optional end-user deployment services. For example, the order may include a first SKU for the computing device and a second SKU for the end-user deployment services. Various operations shown in FIG. 4, such as the operations shown in steps 408-422, may be performed in response to, or in a manner dependent on, the inclusion of the second SKU in the order. The infrastructure access information associated with the user may include one or more of account information associated with the user, information identifying an access portal of the enterprise infrastructure, and an enterprise login credential for the user. In at least some embodiments, the computing device may be an information handling system such as information handling system 100 illustrated in FIG. 1. In other embodiments, the computing device may be an information handling system including more, fewer, or different elements than those of information handling system 100 illustrated in FIG. 1.

At 404, the method may include the ordering system or service to which the order was placed providing order details to an orchestration service and to a device supplier.

Method 400 may include, at 406, the device supplier allocating a computing device that meets the requirements of the requested computing device from available inventory or building the requested computing device, either of which may include installing provisioning software, such as provisioning application 134 illustrated in FIG. 1, on the computing device.

At 408, the method may include the device supplier providing a unique identifier of the requested computing device, such as EC UID 187 shown in FIG. 1 and/or another unique identifier of the requested computing device, to the orchestration service.

At 410, the method includes the device supplier shipping the requested computing device to the end user.

Method 400 may include, at 412, the orchestration service generating a digital certificate that is specific to the device and to the end user for authorizing access to an enterprise infrastructure, as described herein.

At 414, the method may include the orchestration service or, e.g., a distribution server thereof, providing device and end user information to enterprise infrastructure for subsequent access to the enterprise infrastructure by the end user via the computing device once authorized, i.e., provisioning the enterprise infrastructure to recognize the end user and the computing device.

At 416, method 400 includes the end user receiving the requested computing device and launching the provisioning application. In some embodiments, the provisioning application may be launched automatically when the end user turns on and logs into the computing device for the first time or when the computing device connects to the internet for the first time.

Method 400 may include, at 418, the orchestration service or, e.g., a distribution server thereof, providing the digital certificate to the requested computing device through the provisioning application, which then stores the digital certificate in a secure credential storage location on the computing system, such as in secure credential storage 170 illustrated in FIG. 1.

At 420, the method may include the orchestration service or, e.g., a distribution server thereof, providing a nonce value to the end user that was generated specifically for the computing device and the user to unlock the digital certificate. For example, in some embodiments, the nonce value, which may be a one-time-usable value, may be communicated to the user via a text message or an email message. In some embodiments, the nonce value may be a random or pseudo-random number generated by the orchestration service. In some embodiments, the text message or email message may be communicated to the end user on the requested computing device itself. In other embodiments, the text message or email message may be communicated to the end user on another end user device 345, as shown in FIG. 3, such as a mobile phone or a tablet device.

At 422, method 400 may include the end user logging into the enterprise infrastructure and entering the nonce value to unlock the digital certificate stored in the secure credential storage location, thus authorizing access to the infrastructure by the end user on the requested computing device. Once access to the enterprise infrastructure is authorized, user applications executing on the requested computing device, such user applications 136 illustrated in FIG. 1, may be able to access enterprise resources through the enterprise infrastructure (not shown in FIG. 4).

In some embodiments, the digital certificate may be attested before being released to present to the enterprise infrastructure. For example, the digital certificate may be checked to ensure that it was signed by the appropriate orchestration service or to ensure that the EC UID encoded or embedded in the digital certificate matches that of the computing device. If not, the digital certificate may be destroyed or otherwise disabled, and a message to that effect may be sent to the end user from the orchestration service. In some embodiments, the digital certificate stored in the secure credential storage location may be valid only for a predetermined period of time, and the provisioning software may be configured to disable the digital certificate in response to the predetermined period of time expiring.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for provisioning a computing device, comprising:
   receiving an order for the computing device, the order including a first identifier and a second identifier, the first identifier indicating a configuration of the computing device and the second identifier indicating end-user deployment services associated with a user;
   in response to the order including the second identifier, generating, by a device orchestration service, a digital certificate based on the first identifier and the second identifier;
   receiving, by provisioning software that executes on the computing device to provision the computing device for access to an enterprise infrastructure from a device orchestration service through which computing devices are provisioned to access the enterprise infrastructure, the digital certificate representing a credential for accessing, by the user associated with the second identifier via the computing device, the enterprise infrastructure;
   storing, by the provisioning software, the digital certificate in a secure credential storage location on the computing device;

receiving, by the provisioning software via a user interface, a one-time-usable nonce value generated by the device orchestration service and usable to unlock the digital certificate;

unlocking, by the provisioning software and using the nonce value, the digital certificate stored in the secure credential storage location; and presenting the digital certificate to the enterprise infrastructure to authorize access to the enterprise infrastructure by the user via the computing device.

2. The method of claim 1, wherein generating the digital certificate further comprises, generating, by the orchestration service, the digital certification based on infrastructure access information associated with the user.

3. The method of claim 1, wherein the infrastructure access information associated with the user comprises at least one of:

account information associated with the user;

information identifying an access portal of the enterprise infrastructure; and an enterprise login credential for the user.

4. The method of claim 1, further comprising accessing, by an application executing on the computing device, the enterprise infrastructure.

5. The method of claim 1, wherein:

the method further comprises receiving, by the device orchestration service, an indication that end-user deployment has been requested on behalf of the user; and said receiving the digital certificate, said storing the digital certificate, said receiving the nonce value, and said unlocking the digital certificate are performed in response to determining that end-user deployment has been requested.

6. The method of claim 1, further comprising providing, to the user by the device orchestration service via a text message or an email message, the nonce value.

7. The method of claim 1, wherein presenting the digital certificate to the enterprise infrastructure comprises communicating, by the provisioning software, the digital certificate to the enterprise infrastructure in conjunction with a first login to the enterprise infrastructure by the user via the computing device.

8. A system for provisioning an information handling system, comprising:

a device ordering system that receives an order for an information handling system, the order including a first identifier and a second identifier, the first identifier indicating a configuration of the information handling system and the second identifier indicating end-user deployment services associated with a user;

a device orchestration service through which information handling systems are provisioned to access an enterprise infrastructure, the device orchestration service configured to generate, in response to the order including the second identifier, a digital certificate for the information handling system based on the first identifier and the second identifier, the digital certificate representing a credential for accessing, by the user, the enterprise infrastructure;

the information handling system, including:

a secure credential storage medium;

a processor;

a memory storing program instructions that when executed by the processor cause the processor to:

receive the digital certificate from the device orchestration service;

store the digital certificate in the secure credential storage medium;

receive, via a user interface of the information handling system, a one-time-usable nonce value generated by the device orchestration service and usable to unlock the digital certificate;

unlock, using the nonce value, the digital certificate stored in the secure credential storage medium; and present the digital certificate to the enterprise infrastructure to authorize access to the enterprise infrastructure by the user via the computing device.

9. The system of claim 8, wherein:

the information handling system further comprises an embedded controller; and the first identifier of the information handling system comprises an identifier of the embedded controller.

10. The system of claim 8, wherein the digital certificate is further based on infrastructure access information associated with the user, the infrastructure access information comprising at least one of:

account information associated with the user;

information identifying an access portal of the enterprise infrastructure; and an enterprise login credential for the user.

11. The system of claim 8, wherein presenting the digital certificate to the enterprise infrastructure comprises communicating the digital certificate to the enterprise infrastructure in conjunction with a first login to the enterprise infrastructure by the user via the information handling system.

12. The system of claim 8, wherein:

the digital certificate is valid for a predetermined period of time; and when executed by the processor, the program instructions further cause the processor to disable the digital certificate stored in the secure credential storage medium in response to the predetermined period of time expiring.

13. Non-transitory computer readable memory media storing instructions executable by a processor for:

receiving an order for a computing device, the order including a first identifier and a second identifier, the first identifier indicating a configuration of the computing device and the second identifier indicating end-user deployment services associated with a user;

in response to the order including the second identifier, generating, by a device orchestration service, a digital certificate based on the first identifier and the second identifier;

receiving, on a computing device from a device orchestration service through which computing devices are provisioned to access an enterprise infrastructure, the digital certificate representing a credential for accessing, by the user associated with the second identifier via the computing device, the enterprise infrastructure;

storing the digital certificate in a secure credential storage location on the computing device;

receiving, via a user interface, a one-time-usable nonce value generated by the device orchestration service and usable to unlock the digital certificate;

unlocking, using the nonce value, the digital certificate stored in the secure credential storage location; and presenting the digital certificate to the enterprise infrastructure to authorize access to the enterprise infrastructure by the user via the computing device.

14. The non-transitory computer readable memory media of claim 13, wherein the digital certificate is further dependent on infrastructure access information associated with the user.

15. The non-transitory computer readable memory media of claim 14, wherein:
the infrastructure access information associated with the user comprises at least one of:
account information associated with the user;
information identifying an access portal of the enterprise infrastructure; and
an enterprise login credential for the user.

16. The non-transitory computer readable memory media of claim 13, wherein said receiving the digital certificate, said storing the digital certificate, said receiving the nonce value, and said unlocking the digital certificate are performed in response to determining that an end-user deployment service has been requested for the computing device.

17. The non-transitory computer readable memory media of claim 13, wherein presenting the digital certificate to the enterprise infrastructure comprises communicating the digital certificate to the enterprise infrastructure in conjunction with a first login to the enterprise infrastructure by the user via the computing device.

18. The non-transitory computer readable memory media of claim 13, wherein:
the digital certificate is valid for a predetermined period of time; and
the instructions are further executable by the processor for disabling the digital certificate stored in the secure credential storage medium in response to the predetermined period of time expiring.

* * * * *